(12) United States Patent
Ruff

(10) Patent No.: US 12,397,850 B2
(45) Date of Patent: Aug. 26, 2025

(54) STEERING DEVICE AND METHOD FOR PRODUCING A STEERING DEVICE

(71) Applicant: Robert Bosch GmbH, Stuttgart (DE)

(72) Inventor: Martin Ruff, Heubach (DE)

(73) Assignee: Robert Bosch GmbH, Stuttgart (DE)

( * ) Notice: Subject to any disclaimer, the term of this patent is extended or adjusted under 35 U.S.C. 154(b) by 778 days.

(21) Appl. No.: 17/641,930

(22) PCT Filed: Aug. 6, 2020

(86) PCT No.: PCT/EP2020/072073
§ 371 (c)(1),
(2) Date: Mar. 10, 2022

(87) PCT Pub. No.: WO2021/052674
PCT Pub. Date: Mar. 25, 2021

(65) Prior Publication Data
US 2022/0332363 A1 Oct. 20, 2022

(30) Foreign Application Priority Data
Sep. 20, 2019 (DE) ..................... 10 2019 214 406.3

(51) Int. Cl.
*B62D 5/04* (2006.01)
(52) U.S. Cl.
CPC ......... *B62D 5/0424* (2013.01); *B62D 5/0403* (2013.01); *B62D 5/0481* (2013.01)
(58) Field of Classification Search
CPC ... B62D 5/0424; B62D 5/0403; B62D 5/0481
USPC ................................................ 180/443, 444
See application file for complete search history.

(56) References Cited

U.S. PATENT DOCUMENTS

| 10,000,227 B2* | 6/2018 | Kurokawa ............... B62D 6/10 |
| 2004/0099064 A1 | 5/2004 | Viola et al. |
| 2015/0175192 A1 | 6/2015 | Sin |

(Continued)

FOREIGN PATENT DOCUMENTS

| CN | 104724161 A | 6/2015 |
| CN | 110155173 A | 8/2019 |
| CN | 111699371 A | 9/2020 |

(Continued)

OTHER PUBLICATIONS

International Search Report corresponding to International Patent Application No. PCT/EP2020/072073, mailed Nov. 12, 2020 (5 pages).

*Primary Examiner* — Jacob D Knutson
(74) *Attorney, Agent, or Firm* — Maginot, Moore & Beck LLP

(57) ABSTRACT

A steering device includes a steering housing configured to receive and/or to hold at least one steering component, the steering housing including at least one housing section that is made from synthetic material, and a sensor unit which is configured to detect at least one detection variable. The sensor unit is configured to detect a surface characteristic of the at least one steering component and/or to detect a foreign substance penetrating the steering housing. The sensor unit is connected in a bonded manner to the at least one housing section and is integrated and/or embedded at least to a large extent in the synthetic material of the at least one housing section.

13 Claims, 2 Drawing Sheets

(56) References Cited

U.S. PATENT DOCUMENTS

2017/0160385 A1\* 6/2017 Iske .................. G01S 15/93
2018/0120264 A1  5/2018 Sato et al.

FOREIGN PATENT DOCUMENTS

| | | |
|---|---|---|
| DE | 102 50 321 A1 | 6/2003 |
| DE | 10 2005 055 949 A1 | 5/2007 |
| DE | 601 21 541 T2 | 7/2007 |
| DE | 102012023073 A1 \* | 5/2013 ............... B62D 5/04 |
| DE | 10 2012 223 273 A1 | 6/2013 |
| DE | 10 2014 009 111 A1 | 6/2015 |
| DE | 10 2016 013 270 A1 | 5/2018 |
| DE | 10 2016 123 900 A1 | 6/2018 |
| DE | 10 2017 207 094 A1 | 10/2018 |
| DE | 102017211278 A1 \* | 1/2019 ........... B62D 5/0424 |
| DE | 102018202226 A1 \* | 8/2019 ............... B62D 1/20 |
| EP | 1746011 A1 \* | 1/2007 ........... B62D 5/0403 |
| EP | 1 840 545 A2 | 10/2007 |
| JP | 2004-153897 A | 5/2004 |
| JP | 2005-91092 A | 4/2005 |
| JP | 2013-46506 A | 3/2013 |
| JP | 2019-521636 A | 7/2019 |
| KR | 10-2015-0074524 A | 7/2015 |
| KR | 2017093392 A \* | 8/2017 ........... B62D 5/0403 |
| WO | 2019/158296 A1 | 8/2019 |

\* cited by examiner

STEERING DEVICE AND METHOD FOR PRODUCING A STEERING DEVICE

This application is a 35 U.S.C. § 371 National Stage Application of PCT/EP2020/072073, filed on Aug. 6, 2020, which claims the benefit of priority to Serial No. DE 10 2019 214 406.3, filed on Sep. 20, 2019 in Germany, the disclosures of which are incorporated herein by reference in their entirety.

BACKGROUND

The disclosure is based on a steering device according to the disclosure. In addition, the disclosure relates to a steering system having such a steering device and to a method for producing a steering device.

Steering housings that are known in the prior art so as to receive a steering gear, a control device and/or a steering actuator are generally made from a die cast aluminum alloy.

Furthermore, the generic publication DE 10 2017 207 094 A1 discloses a steering system having a steering housing which is made at least in part from synthetic material, wherein a control housing so as to receive a control device and/or a drive housing so as to receive an electric motor can be produced in a synthetic material injection molding process. In addition, the steering system comprises in this case a sensor unit having at least one moisture sensor that is arranged within a sensing space of the steering housing. A sensor system of this type is essential in particular for future highly automated and/or autonomous driving in order to detect an unexpected, sudden failure of a steering component, such as for example failure of a steering gear and to be able to comply with the safety requirements that are associated with the highly automated and/or autonomous driving and are placed on the steering system. However, the arrangement of the moisture sensor within the sensing space as described in the publication DE 10 2017 207 094 A1 leads to a relatively complicated assembly process. Furthermore, an arbitrary positioning of the moisture sensor within the sensing space is only possible with great difficulty owing to further steering components that are arranged in the steering housing and/or owing to accessibility of the corresponding region.

The object of the disclosure is in particular to provide a steering device having improved characteristics with respect to an assembly process. The object is achieved by the features of the disclosure, whereas advantageous embodiments and developments of the disclosure are apparent in the disclosure.

SUMMARY

The disclosure is based on a steering device having a steering housing that is provided so as to receive and/or to hold at least one steering component and that comprises at least one housing section that is made from synthetic material, and said steering device having a sensor unit so as to detect at least one detection variable that correlates in particular with a state of the steering component.

It is proposed that the sensor unit is connected to the housing section in a bonded manner, such as for example by means of a melt connection, a spray connection and/or an adhesive connection. This embodiment renders it possible in particular to simplify an assembly process. In addition, it is possible to position the sensor unit on and/or in the steering housing in an advantageously flexible manner. Furthermore, it is advantageously possible to increase efficiency, in particular efficiency relating to a component, installation and/or costs and to increase operational safety.

The term a "steering device" is to be understood in this context to mean in particular at least a part, in particular a sub-assembly, of a steering system. In particular, the steering system is provided in this case for use in a vehicle, advantageously in a motor vehicle and particularly advantageously in an electric motor vehicle. Moreover, the vehicle comprises in this context preferably at least two different driving modes, in particular a conventional and/or manual driving mode and a highly automated and/or autonomous driving mode. The term "provided" is to be understood to mean in particular especially designed and/or equipped. This is to be understood to mean in particular that an object is provided for a specific function and that the object fulfills and/or performs this specific function in at least one application mode and/or operating mode.

The steering housing is designed in particular as a one-piece or multi-piece construction and comprises advantageously at least one control housing so as to receive a control device, at least one drive housing so as to receive a steering actuator that is designed in particular as an electric motor, and/or at least one steering gear housing so as to receive a steering gear and/or a coupling gear so as to connect the steering actuator, in particular to the steering gear. The steering component can consequently be designed in particular as a steering gear or part of the steering gear, as a steering adjusting element, which is designed for example as a toothed rack, or part of the steering adjusting element, as a steering sensor or part of the steering sensor, as a control device or part of the control device, as a steering actuator or part of the steering actuator, as a coupling gear or part of the coupling gear, as a track rod or part of the track rod and/or as a sealing unit, which is designed for example as bellows, or part of the sealing unit. In particular, the steering device can also comprise the at least one steering component that is in particular to be monitored and/or multiple steering components that are to be monitored.

Furthermore, the sensor unit is provided in particular so as to detect the detection variable in a contact-based manner or advantageously in a contactless manner. For this purpose, the sensor unit comprises in particular at least one sensor element that functions in an electric, acoustic, optical and/or magnetic manner and that can be advantageously designed as a passive and/or active sensor. The sensor element is moreover advantageously arranged on a side of the housing section that is facing the steering component and/or on a side of the housing section that is facing a receiving space of the steering housing. Advantageously, the sensor unit can also comprise multiple sensor elements that are in particular of an identical construction with respect to one another or are advantageously different to one another. Furthermore, the sensor unit is provided in particular so as to provide a detection signal that correlates with the detection variable and advantageously to provide transmission in a wire-connected manner to the control device and in particular to a computing unit of the control device. Moreover, the detection variable preferably correlates with a state of the steering component and can initiate for example a state change and/or a material change of the steering component and/or can correspond with a prevailing state, a state change and/or a material change of the steering component for example in the form of material degradation. It is particularly preferred that the sensor unit is provided in this case so as to detect a surface characteristic of the steering component and/or so as to detect a foreign substance penetrating the steering housing, such as for example a solid material, in particular dust and/or dirt, and/or a liquid, in particular water.

In accordance with one particularly preferred embodiment, it is proposed that the sensor unit is integrated and/or embedded at least in part and preferably to a large extent in the synthetic material of the housing section, whereby in particular it is possible to reduce a number of required assembly steps and simultaneously to provide an advantageously robust steering device. It is particularly preferred that in this case the housing section is injection molded over the sensor unit. The term "at least to a large extent" is to be understood to mean in particular at least 55%, advantageously at least 75% and particularly advantageously at least 95%.

Moreover, it is proposed that the steering device comprises a connector unit having at least one connecting line, for example in the form of a conductor track, so as to contact the sensor unit, in particular electrically, wherein the connector unit is preferably provided so as to connect the sensor unit to the control device. Advantageously, the connecting line is integrated and/or embedded in this case in the synthetic material of the housing section. Particularly advantageously, the connecting line is produced and/or connected to the housing section by means of an MID (molded interconnect devices) method. This renders it possible to realize in particular a particularly flexible contact to the sensor unit. In addition, as a result the connecting line can be advantageously routed to a particularly easily accessible site, whereby it is possible to realize a particularly simple connection to the control device.

Furthermore, it is proposed that, so as to connect a steering actuator, in particular the steering actuator already mentioned above, the housing section is arranged in the region of a coupling gear, in particular in the region of the coupling gear already mentioned above. In this case, the steering component can be designed advantageously as a coupling gear or as part of the coupling gear, such as for example as a ball screw drive, as a toothed belt disk and/or as a worm gear or the like. This renders it possible in particular to increase operational safety. In particular, this renders it possible to also monitor steering components that are particularly critical and/or difficult to monitor.

The steering housing could have in particular a base body, which is made at least to a large extent and preferably entirely from synthetic material, wherein the housing section is designed as a separate housing element that is connected to the base body in a non-positive locking manner, a positive-locking manner and/or a bonded manner. In accordance with a preferred embodiment of the disclosure, however, it is proposed that the steering housing has a base body that is made to a large extent and preferably entirely from synthetic material, and the housing section is designed in one piece with the base body. The base body and the housing section can in this case be made in particular from the same material, in particular from the same synthetic material and for example be produced in a single-component injection molding process. Alternatively, the base body and the housing section can, however, also be made from different materials, in particular different synthetic materials, and can be produced for example in a two-component and/or multi-component injection molding process. It is particularly preferred that the base body and the housing section are designed as a common injection molded part. The term "base body of the steering housing" is to be understood in this context to mean in particular a part of the steering housing that comprises at least 55%, advantageously at least 75% and particularly advantageously at least 95% of the entire steering housing. This renders it possible to produce the steering device in a particularly simple and/or cost-efficient manner.

Alternatively, it is proposed that the steering housing has a base body, which is made at least to a large extent and preferably entirely from metal, such as for example aluminum, and the housing section is designed as a separate housing element that is connected to the base body in a non-positive locking manner, a positive-locking manner and/or a bonded manner. This renders it possible in particular to provide an advantageously robust steering device that can be used in particular also in the range of high temperatures that can arise for example as a result of combustion gases.

So as to detect the detection variable, the sensor unit could comprise a sensor element that is designed as a CCD sensor and/or as a camera. However, it is possible in particular to detect the detection variable in a particularly simple and/or cost-efficient manner using control technology if so as to detect the detection variable the sensor unit has at least one sensor element that is designed as an acceleration sensor, moisture sensor and/or a corrosion sensor.

In addition, a method is proposed for producing a steering device, in particular the steering device already mentioned above, in which at least one housing section of a steering housing is produced from synthetic material, said steering housing being provided in particular so as to receive and/or to hold at least one steering component, and a sensor unit so as to detect at least one detection variable that correlates in particular with a state of a steering component is integrated and/or embedded in the synthetic material of the housing section during the production of the housing section. This renders it possible in particular to realize the advantages already mentioned above. In particular, it is possible thereby to simplify an assembly process, wherein in particular it is possible to reduce a number of required assembly steps. In addition, it is possible to position the sensor unit on and/or in the steering housing in an advantageously flexible manner. Furthermore, it is advantageously possible to increase efficiency, in particular efficiency relating to a components, installation space and/or costs and to increase operational safety.

Moreover, it is proposed that the housing section is produced in an injection molding process and the synthetic material of the housing section is injection molded over the sensor unit. This renders it possible in particular to produce the steering device in a particularly simple manner, wherein advantageously it is possible to forego over-dimensioning the finishing process and to reduce costs.

Alternatively or in addition thereto, it is proposed that the housing section is produced and/or is connected, in particular electrically, to the sensor unit by means of an MID (molded interconnect devices) method. Advantageously, in this case at least the connector unit and/or at least one connecting line of the connector unit is produced and/or is connected to the housing section by means of the MID (molded interconnect devices) method. This renders it possible in particular to produce the steering device in a particularly simple manner and to contact the sensor unit in a particularly simple manner.

The steering device, the steering system and the method for producing the steering device is in this case not to be limited to the above described application and embodiment. In particular, the steering device, the steering system and the method for producing the steering device can have a number of individual elements, components and units that differs from a number of individual elements, components and units disclosed herein.

BRIEF DESCRIPTION OF THE DRAWINGS

Further advantages arise from the following description of the drawings. An exemplary embodiment of the disclosure is illustrated in the drawings.

In the drawings.

DETAILED DESCRIPTION

Figure 1:
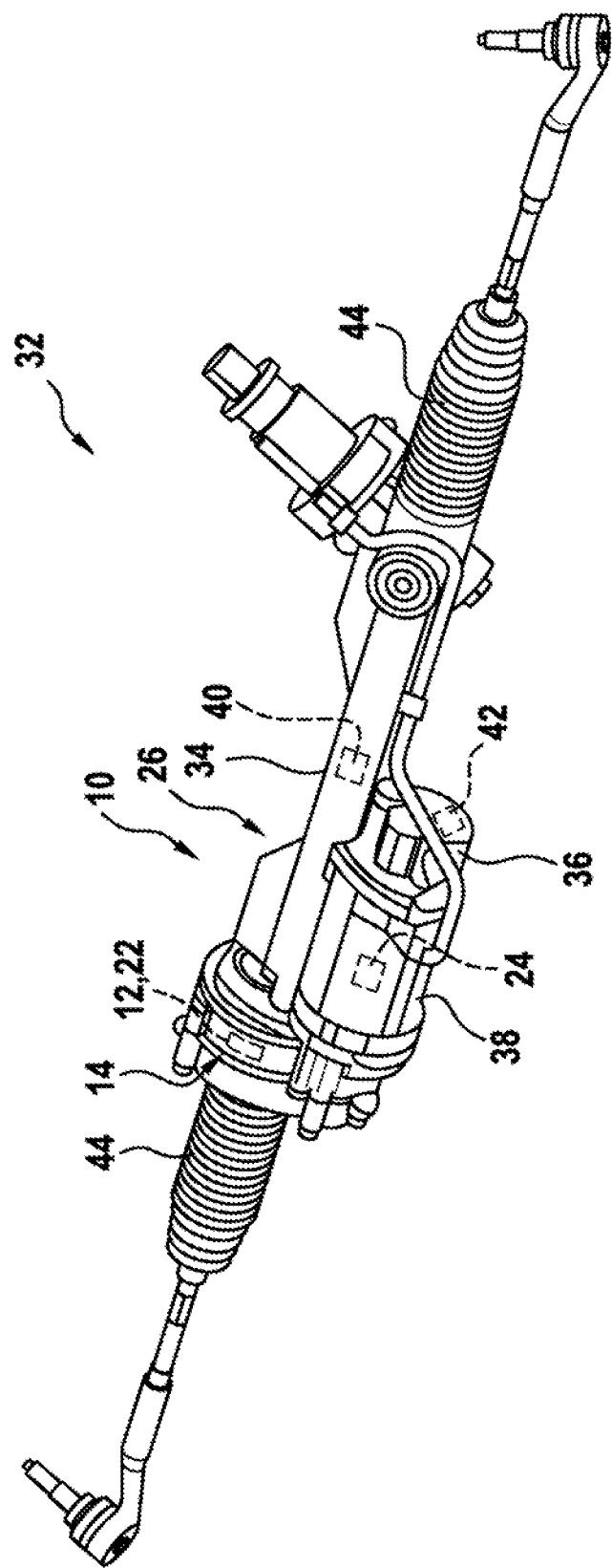
FIG. 1 illustrates a perspective view of at least one part of an exemplary steering system having a steering device that comprises a steering housing.

FIG. 1 illustrates a part of an exemplary steering system 32 in a perspective view. The steering system 32 is designed in the present case as an electrically supported steering system. Moreover, the steering system 32 is provided for use in a vehicle (not illustrated), in particular in an electric motor vehicle. The vehicle comprises in this case by way of example at least two different driving modes, in particular a conventional and/or manual driving mode and a highly automated and/or autonomous driving mode. In an installed state, the steering system 32 is operatively connected to the vehicle wheels of the vehicle and is provided so as to influence a driving direction of the vehicle. Moreover, the steering system 32 can be designed in particular as a conventional steering system having a mechanical activation or as a steer-by-wire steering system. Alternatively, a vehicle could, however, also have precisely one driving mode, in particular a conventional and/or manual driving mode or a highly automated and/or autonomous driving mode. In addition, a vehicle could be fundamentally designed also as a vehicle that differs from an electric motor vehicle, for example it could be designed as a vehicle having a combustion engine.

The steering system 32 has a steering device. The steering device comprises a steering housing 10. The steering housing 10 is designed as an outer housing. The steering housing 10 is designed as a receiving housing and in particular so as to receive and/or to hold at least one steering component 12. The steering housing 10 comprises in the present case by way of example a steering gear housing 34, a control housing 36 and a drive housing 38. The steering gear housing 34, the steering housing 36 and the drive housing 38 are in this case by way of example connected to one another in one piece. Alternatively a steering housing could, however, also comprise merely a steering gear housing, a steering housing or a drive housing. In addition, a steering housing could also comprise merely a steering gear housing and a steering housing, which is advantageously connected in one piece to the steering gear housing, or a steering housing and a drive housing that is advantageously connected in one piece to the steering housing. Furthermore, it is conceivable to design a steering gear housing separately from a steering housing and/or from a drive housing or to design a steering housing separately from a steering gear housing and/or from a drive housing or to design a drive housing separately from a steering gear housing and/or from a control housing.

The steering housing 10 has a base body 26. The base body comprises in the present case at least 90% of the entire steering housing 10. The base body 26 has at least a part of the steering gear housing 34, at least a part of the control housing 36 and at least a part of the drive housing 38. Moreover, in the present case the base body 26 is made from synthetic material, in particular from a thermoplastic and/or a thermosetting plastic. Alternatively, a base body of a steering housing could, however, also be made at least to a large extent from a metal, such as for example aluminum.

Furthermore, the steering housing 10 has a housing section 14 that is connected to the base body 26. The housing section 14 comprises in the present case a maximum 10% and advantageously a maximum 5% of the entire steering housing 10. The housing section 14 has at least a part of the steering gear housing 34, at least a part of the control housing 36 and/or at least a part of the drive housing 38. In the present case, the housing section 14 has, however, merely a part of the steering gear housing 34. Moreover, the housing section 14 is at least in part different from the steering gear housing 34, the control housing 36 and the drive housing 38. The housing section 14 is arranged in the region of a coupling gear 22. Furthermore, the housing section 14 is connected in one piece to the base body 26. The housing section 14 is made from synthetic material, in particular from a thermoplastic and/or a thermosetting plastic. In the present case, the housing section 14 and the base body 26 are by way of example made from the same synthetic material. The base body 26 and the housing section 14 are in this case designed as a common injection molded part. Fundamentally, a base body and a housing section could, however, also be made from different materials and/or be designed separately from one another. In this case, it is also conceivable for example to design the housing section as a separate housing element that can be connected to the base body in a non-positive locking manner, a positive-locking manner and/or a bonded manner. Moreover, it is conceivable to arrange a housing section in a region of the steering housing that differs from a region of the coupling gear.

Furthermore, the steering device comprises a steering gear 40 (only illustrated schematically in FIG. 1). The steering gear 40 is arranged in the steering gear housing 34. The steering gear 40 is moreover designed by way of example as a rack-and-pinion steering gear and is provided so as to convert a steering input into a steering movement of the vehicle wheels that are advantageously designed as front wheels. For this purpose, the steering gear 40 comprises at least one steering adjusting element (not illustrated) that is mounted in particular in a movable manner in the steering gear housing 34. In principle, a steering gear could, however, also be designed as a worm steering gear and/or as a screw-spindle steering gear or the like.

Furthermore, the steering device comprises a steering actuator 24 (only illustrated schematically in FIG. 1). The steering actuator 24 is arranged in the drive housing 38. The steering actuator 24 is operatively connected to the steering gear 40 and is provided so as to provide a steering torque and to introduce said steering torque into the steering gear 40. For this purpose, the steering actuator 24 comprises at least one electric motor (not illustrated) that is designed in the present case in particular as a permanently excited synchronous motor. In principle, a steering actuator could, however, also comprise multiple electric motors.

Furthermore, the steering device comprises the coupling gear 22 (only illustrated schematically in FIG. 1). The coupling gear 22 is arranged in the steering gear housing 34. The coupling gear 22 is operatively connected to the steering actuator 24 and to the steering gear 40 and is provided so as to connect the steering actuator 24 to the steering gear 40. For this purpose, the coupling gear 22 can comprise at least one belt having a ball screw drive (not illustrated) that is coupled to the steering adjusting element. Alternatively, a coupling gear could also comprise for example a worm gear, in particular in lieu of a belt having a ball screw drive.

Moreover, the steering device has a control device 42 (only illustrated schematically in FIG. 1). The control device 42 is arranged in the control housing 36. The control device 42 is operatively connected to the steering actuator 24 and is provided so as to control the steering actuator 24 during operation. For this purpose, the control device 42 comprises in particular a computing unit (not illustrated) having at least one processor, for example in the form of a microprocessor, and said control device comprises at least one operational memory.

In addition, the steering device comprises in the present case a sealing unit 44, in particular having at least one bellows. In the present case, the steering device comprises on each vehicle side a corresponding sealing unit 44 that seals the steering gear housing 34 with regard to fluid technology. Fundamentally, it is, however, also conceivable to design a sealing unit differently and in so doing for example to omit a bellows.

Figure 2:
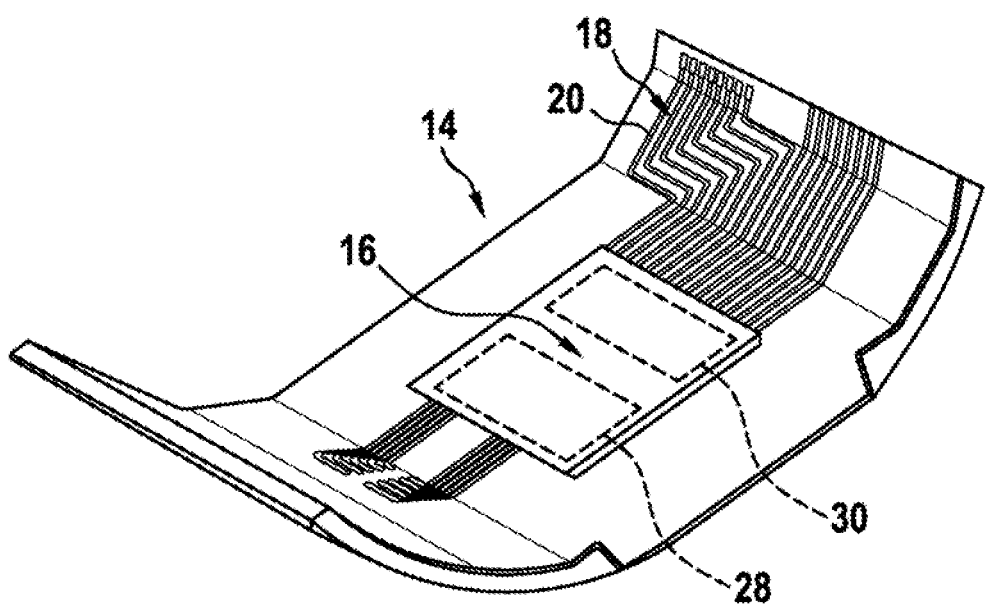
FIG. 2 illustrates a detailed view of a housing section of the steering housing, said housing section being made from synthetic material, and of a sensor unit that is connected to the housing section

In particular in order to increase operational safety of the steering system 32 and/or to comply with the safety requirements associated with highly automated and/or autonomous driving, the steering device comprises moreover a sensor unit 16 (cf. FIG. 2; not illustrated in FIG. 1). The sensor unit 16 is provided so as to detect at least one detection variable. The sensor unit is provided so as to detect at least one detection variable that correlates with a state of a steering component 12 that is to be monitored. The detection variable can initiate for example a state change and/or a material change of the steering component 12 and/or correspond with a prevailing state, a state change and/or a material change of the steering component 12. In the present case, the sensor unit 16 is provided so as to detect a surface characteristic of the steering component and/or to detect a foreign substance, in particular water, penetrating the steering housing 10.

In the present case, in addition, the coupling gear 22 corresponds to the steering component 12 that is in particular to be monitored. The sensor unit 16 is consequently allocated to the coupling gear 22 and provided so as to monitor the coupling gear 22. Alternatively, a steering component that is in particular to be monitored could also be different from a coupling gear and for example could correspond to a steering gear, a steering adjusting element, a steering sensor, a control device, a steering actuator, a track rod and/or a sealing unit.

So as to detect the detection variable, the sensor unit comprises at least one sensor element 28,30. In the present case, the sensor unit 16 comprises for example two sensor elements 28,30. The sensor elements 28,30 are designed differently from one another. A first sensor element 28 of the sensor elements 28,30 is in this case designed by way of example as an acceleration sensor, whereas a second sensor element 30 of the sensor elements 28,30 is designed by way of example as a moisture sensor. Fundamentally, a sensor unit could also comprise merely a sensor element or at least one sensor element that is different from an acceleration sensor and/or a moisture sensor.

Moreover, the steering device comprises a connector unit 18 so as to electrically contact the sensor unit 16 (cf. FIG. 2; not illustrated in FIG. 1). The connector unit 18 is provided in the present case so as to connect the sensor unit 16 to the control device 42. For this purpose, the connector unit 18 comprises at least one connecting line 20, for example in the form of a conductor track. In the present case, the connector unit comprises by way of example multiple, in particular mutually identical, connecting lines 20.

In order to simplify an assembly process, it is proposed that the sensor unit 16 and in particular the sensor elements 28,30 are connected in a bonded manner to the housing section 14 (cf. in particular FIG. 2). The sensor unit 16 is in this case integrated and/or embedded in the synthetic material of the housing section 14. The sensor unit 16 is integrated and/or embedded in the synthetic material of the housing section 14 during the production of the housing section 14. In this case, the housing section 14 is advantageously injection molded over the sensor unit 16. This renders it possible in particular to position the sensor unit 16 in an advantageously flexible manner on and/or in the steering housing 10. The sensor unit 16 is moreover arranged on the housing section 14 in such a manner that the sensor elements 28,30 are arranged on a side of the housing section 14 that faces the steering component 12 and/or are arranged on a side of the housing section 14 that faces a receiving space of the steering housing 10.

Furthermore, the connecting lines 20 are integrated and/or embedded in the synthetic material of the housing section 14. It is preferred that the connecting lines 20 are produced and/or are connected to the housing section by means of an MID (molded interconnect devices) method. Fundamentally, a connector unit and/or at least one connecting line could also be designed separately from a housing section, for example in the form of a movable power cable. In addition, a connector unit and/or at least one connecting line could even be integrated and/or embedded in a synthetic material of the housing section during the production of a housing section.

Figure 3:
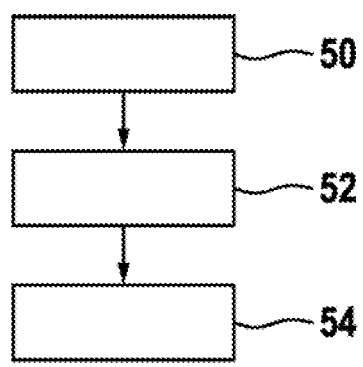
FIG. 3 illustrates an exemplary flow diagram of a method for producing the steering device.

Finally, FIG. 3 illustrates an exemplary flow diagram of a method for producing the steering device.

In a first method step 50, the sensor unit 16 is provided so as to detect the detection variable that correlates in particular with the state of the steering component 12.

In a second method step 52, the housing section 14 and/or the steering housing 10 is produced in an injection molding process, wherein the synthetic material of the housing section 14 is injection molded over the sensor unit 16 with the result that the sensor unit 16 is integrated and/or embedded in the synthetic material of the housing section 14 during the production of the housing section 14.

In a third method step 54, the housing section is electrically connected to the sensor unit 16 by means of an MID (molded interconnect devices) method. In this case, at least the connector unit 18 and/or at least one connecting line 20 of the connector unit 18 is produced and/or connected to the housing section 14 by means of the MID (molded interconnect devices) method.

The exemplary flow diagram in FIG. 3 is in this case in particular merely to describe by way of example a method for producing the steering device. In particular, individual method steps and/or a sequence of method steps can vary. In this case, it is in particular also conceivable to omit a third method step and/or to integrate and/or embed the connector unit 18 and/or at least one connecting line 20 of the connector unit 18 in the synthetic material of the housing section 14 in a second method step and consequently during the production of the housing section 14.

The invention claimed is:

1. A steering device, comprising
a steering housing configured to receive and/or to hold at least one steering component, the steering housing including at least one housing section that is made from synthetic material; and
a sensor unit configured to detect at least one detection variable, wherein
the sensor unit is configured to detect a surface characteristic of the at least one steering component and/or to detect a foreign substance penetrating the steering housing, and
the sensor unit is embedded in the synthetic material of the at least one housing section, in a surface of the at least one housing section facing the at least one steering component, with the sensor unit facing the at least one steering component.

2. The steering device as claimed in claim 1, further comprising:
a connector unit having at least one connecting line configured to contact the sensor unit, wherein the connecting line is integrated and/or embedded in the synthetic material of the housing section.

3. The steering device as claimed in claim 1, wherein the at least one housing section is arranged in a region of a coupling gear and configured to connect an electric motor.

4. The steering device as claimed in claim 1, wherein:
the steering housing has a base body, which is made at least to a large extent from the synthetic material; and
the housing section is designed in one piece with the base body.

5. The steering device as claimed in claim 1, wherein:
the steering housing has a base body, which is made at least to a large extent from metal; and
the housing section is designed as a separate housing element that is connected to the base body in at least one of a non-positive locking manner, a positive locking manner, and a bonded manner.

6. The steering device as claimed in claim 5, wherein:
the steering housing has the base body, which is made at least to the large extent from metal; and
the housing section is designed as the separate housing element that is connected to the base body in a non-positive-locking manner.

7. The steering device as claimed in claim 5, wherein:
the steering housing has the base body, which is made at least to the large extent from metal; and
the housing section is designed as the separate housing element that is connected to the base body in a positive-locking manner.

8. The steering device as claimed in claim 5, wherein:
the steering housing has the base body, which is made at least to the large extent from metal; and
the housing section is designed as the separate housing element that is connected to the base body in a bonded manner.

9. The steering device as claimed in claim 1, wherein the sensor unit comprises at least one sensor element that is designed as a moisture sensor and/or a corrosion sensor and configured to detect the at least one detection variable.

10. A steering system having at least one steering device as claimed in claim 1.

11. A method for producing a steering device as claimed in claim 1, comprising:
producing the at least one housing section of the steering housing from the synthetic material;
integrating and/or embedding the sensor unit at least to a large extent in the synthetic material of the at least one housing section during the producing of the at least one housing section; and
configuring the sensor unit to detect at least one detection variable.

12. The method as claimed in claim 11, wherein the at least one housing section is produced in an injection molding process and the synthetic material of the housing section is injection molded over the sensor unit.

13. The method as claimed in claim 11, wherein the at least one housing section is produced and/or is connected to the sensor unit using a molded interconnect devices (MID) method.

* * * * *